US010376927B2

(12) United States Patent
Davison (10) Patent No.: US 10,376,927 B2
(45) Date of Patent: Aug. 13, 2019

(54) OBJECT SORTING DEVICES (71) Applicant: Darren Davison, Beaverton, OR (US)

(72) Inventor: Darren Davison, Beaverton, OR (US)

( * ) Notice: Subject to any disclaimer, the term of this patent is extended or adjusted under 35 U.S.C. 154(b) by 30 days.

(21) Appl. No.: 15/813,723

(22) Filed: Nov. 15, 2017

(65) Prior Publication Data
US 2019/0143375 A1 May 16, 2019

(51) Int. Cl.
B07C 5/36 (2006.01)
G06K 13/14 (2006.01)
A63F 1/18 (2006.01)
B07C 3/02 (2006.01)
A63F 1/12 (2006.01)
G06K 9/46 (2006.01)

(52) U.S. Cl.
CPC .............. B07C 5/368 (2013.01); A63F 1/18 (2013.01); B07C 3/02 (2013.01); G06K 13/14 (2013.01); A63F 1/12 (2013.01); G06K 9/46 (2013.01)

(58) Field of Classification Search
CPC .............................................. B07C 5/02; B07C 5/342; B07C 5/362; B07C 5/368; B07C 5/38; A63F 1/10; A63F 1/18; G06K 9/46; G06K 13/14
USPC ....................................................... 209/554
See application file for complete search history.

(56) References Cited

U.S. PATENT DOCUMENTS

| | | | |
|---|---|---|---|
| 1,203,261 A | 10/1916 | Powers | |
| 3,452,509 A | 7/1969 | Hauer | |
| 4,465,192 A * | 8/1984 | Ohba | B65H 83/02 209/534 |
| 4,497,488 A | 2/1985 | Plevyak et al. | |
| 4,566,596 A | 1/1986 | Fustier | |
| 4,921,109 A * | 5/1990 | Hasuo | G06F 7/08 209/552 |
| 5,917,930 A * | 6/1999 | Kayani | G07D 11/50 382/135 |
| 6,250,632 B1 | 6/2001 | Albrecht | |
| 6,403,908 B2 * | 6/2002 | Stardust | A63F 1/14 209/547 |
| 6,676,127 B2 | 1/2004 | Johnson et al. | |
| 6,726,205 B1 | 4/2004 | Purton | |
| 7,537,216 B2 * | 5/2009 | Soltys | A63F 1/14 273/148 R |
| 7,726,457 B2 | 6/2010 | Maier et al. | |
| 7,959,153 B2 | 6/2011 | Franks, Jr. | |
| 8,204,309 B2 * | 6/2012 | Cook | B07C 5/38 382/181 |
| 8,342,525 B2 | 1/2013 | Scheper et al. | |
| 8,523,648 B2 * | 9/2013 | Gilson | A63F 1/00 463/11 |
| 9,227,132 B2 | 1/2016 | VanRossen et al. | |
| 9,378,766 B2 | 6/2016 | Kelly et al. | |

(Continued)

Primary Examiner — Joseph C Rodriguez
(74) Attorney, Agent, or Firm — Mohr Intellectual Property Law Solutions, PC (57) ABSTRACT Apparatuses and methods of operating the same are described. A method may include receiving a card from a first storage compartment. The method may include analyzing the card using a first sensor to obtain characteristic information of the card. The method may include identifying a group associated with the characteristic information. The method may include identifying a second storage compartment associated with the group. The method may include sorting the card to place the card into the second storage compartment.

18 Claims, 9 Drawing Sheets

(56) References Cited

U.S. PATENT DOCUMENTS 9,457,262 B2 * 10/2016 Shigeta ................. A63F 1/10
9,895,720 B2 *  2/2018 Eastwood ............. B07C 5/362

* cited by examiner

OBJECT SORTING DEVICES

BACKGROUND

The collecting of collectible cards has become a major hobby and profession in the United States and throughout the world. In addition to collecting cards as a hobby or profession, the manufacture, marketing, selling, and trading of collectible cards has evolved into a high-volume business. Hobbyist, professionals, and businesses that deal with a high-volume of collectible cards must sort, grade, and store the collectible cards.

SUMMARY

A sorting device may receive an object from a first storage compartment. The sorting device may analyze the object using a first sensor to obtain characteristic information of the object. The sorting device may identify a group associated with the characteristic information. The sorting device may identify a second storage compartment associated with the group. The sorting device may sort the card to place the object into the second storage compartment.

BRIEF DESCRIPTION OF THE DRAWINGS

The present description will be understood more fully from the detailed description given below and from the accompanying drawings of various embodiments of the present embodiment, which, however, should not be taken to limit the present embodiment to the specific embodiments, but are for explanation and understanding only.

DETAILED DESCRIPTION

The disclosed object sorting devices will become better understood through review of the following detailed description in conjunction with the figures. The detailed description and figures provide merely examples of the various embodiments described herein. Those skilled in the art will understand that the disclosed examples may be varied, modified, and altered without departing from the scope of the embodiments described herein. Many variations are contemplated for different applications and design considerations; however, for the sake of brevity, each and every contemplated variation is not individually described in the following detailed description.

Throughout the following detailed description, examples of various object sorting devices are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Individuals and businesses involved in the collectible card industry handle thousands of collectible cards. To collect, buy, sell, and trade the collectible cards, the individuals and businesses grade, sort, and store the collectible cards. Conventionally, the inspecting, sorting, and storing of the collectible cards is done by hand. For example, an individual may select an unorganized card from a stack of collectible cards, visually inspect the card to determine the category or grade of the card, and then file the card in a container for the category or grade of the card. The manual task of inspecting, sorting, and storing the collectible cards can be tedious and time-consuming. Additionally, manually inspecting, sorting, and storing the collectible cards may damage the collectible cards as the individual handles them. Furthermore, loss may occur as the individual(s) inspect, sort, and store the collectible cards. In one example, an individual may identify valuable collectible cards and steal the collectible cards during the inspection, sorting, and storing process. In another example, the individual may unintentionally or intentionally miscategorized a collectible card so that it is not found or is undervalued.

The embodiments described herein may, therefore, include an object sorting device to inspect, sort, and store objects. The sorting device may include a feeder to provide objects to a recognition device. The recognition device may identify characteristic information for the objects and provide sorting instruction or signals to a sorter. The sorter may identify a storage container for the objects in view of the sorting instruction or signals and place the objects in the storage container. One advantage of the sorting device may be to increase a speed that the unsorted objects may be inspected, sorted, and stored. Another advantage of the sorting device may be to decrease loss caused by the handling of the objects by individuals. Another advantage of the sorting device may be to increase an accuracy of the sorting of the objects.

Figure 1:
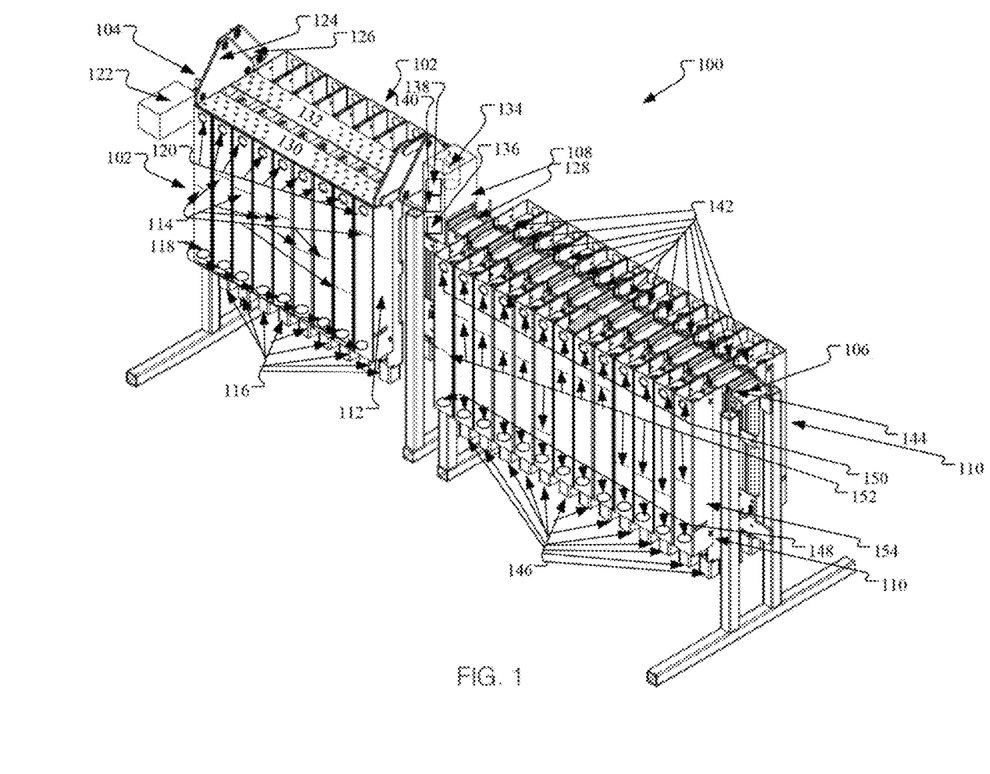
FIG. 1 illustrates a side perspective view of an object sorting device, according to an embodiment.

FIG. 1 illustrates a side perspective view of an object sorting device 100, according to an embodiment. The object sorting device 100 may include a feeding container 102, a placement mechanism 104, a conveyor system 106, a recognition device 108, and a receiver container 110.

Figure 6A:
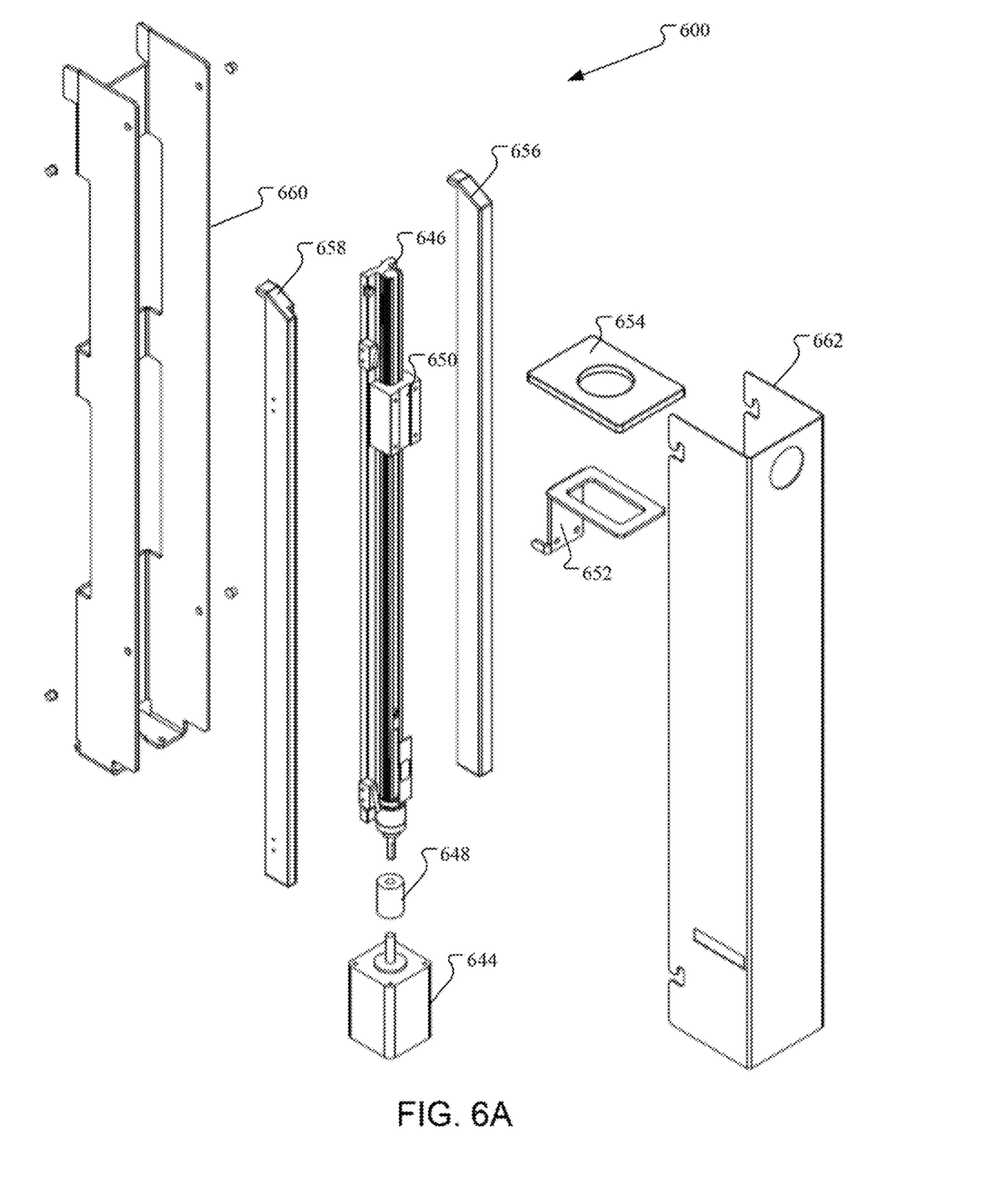
FIG. 6A illustrates an exploded view of a container, according to an embodiment.
Figure 6B:
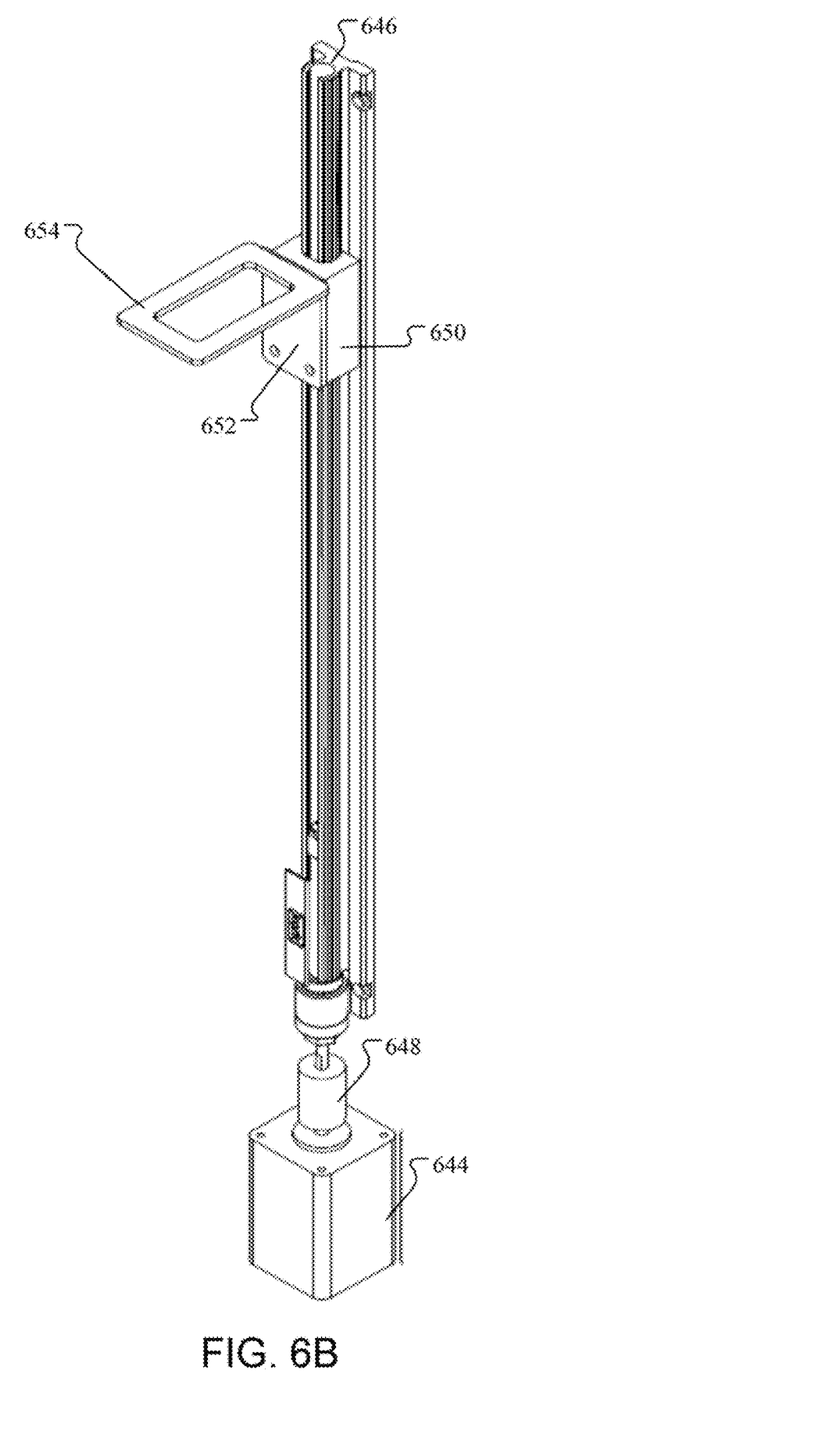
FIG. 6B illustrates an assembled view of the motor and the slide rail, according to an embodiment.
Figure 6C:
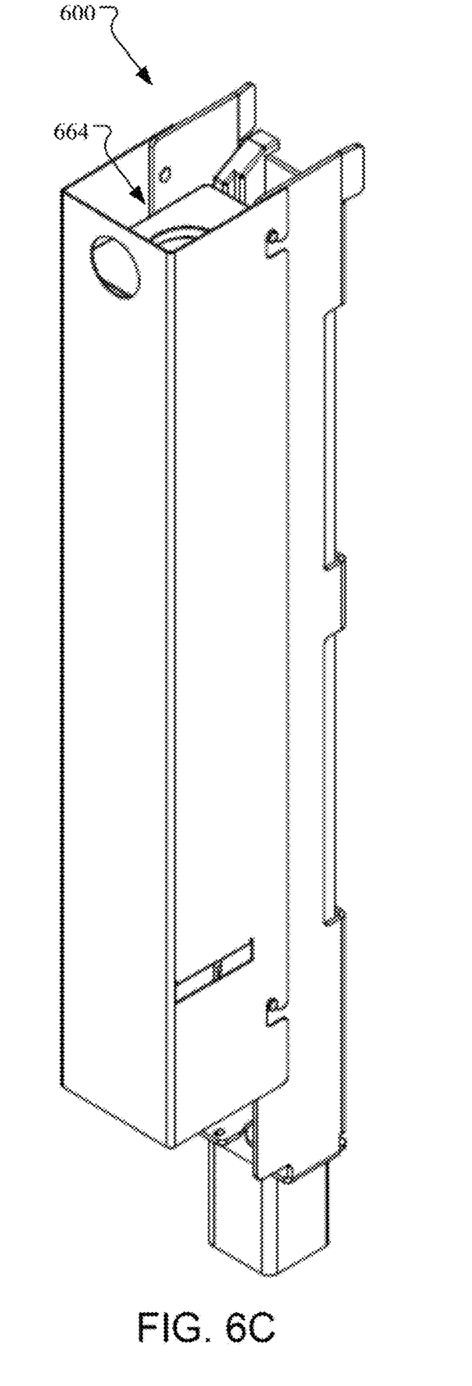
FIG. 6C illustrates a back perspective view of the container, according to an embodiment.
Figure 6D:
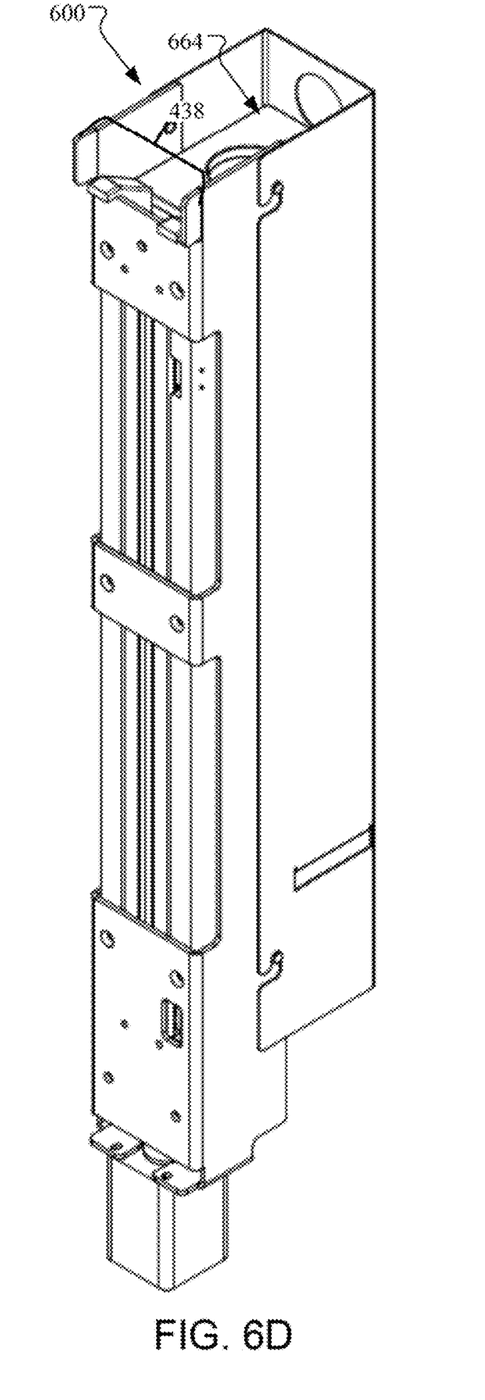
FIG. 6D illustrates a front perspective view of the container, according to an embodiment.

The feeding container 102 may include a cavity 112 to store one or more objects, as illustrated in FIGS. 6C and 6D. In one example, the objects may be cards, papers, books, money, and so forth. The objects may include information or images. In one example, a card may be collectable sport card that is approximately 2½ inches by 3½ inches. The card may be piece of cardboard or paperboard. A face side of the card include a picture of a sport athlete, an official, or a personality. A rear side of the card may include a card number, historical data about a person, and personal information about the person. The personal information may including a name and/or a nickname of the person, a date and place of birth of the person, a career team history, playing statistics for the person, honors for the person, and other information. In another example, the cards may have cartoons or movie characters printed on them.

A feeder may include the feeding container 102 may include platforms 114 that the objects rest on. The feeding container 102 may include a lifting mechanism 116 to raise or lower the platform 114 to provide an object to the placement mechanism 104 to load onto the conveyor system 106. In one embodiment, the lifting mechanism 116 may be a motor or hydraulic lifter connected to the platform 114. The motor may engage the platform 114 to raise or lower the platform 114. In another embodiment, the lifting mechanism 116 may be a spring that raises or lowers based on an amount of weight that is placed on the spring.

The feeding container 102 may include a first sensor 118 and a second sensor 120. The first sensor 118 and the second sensor 120 may be optical sensors, pressure sensors, light sensors, infrared sensors, and so forth. The first sensor 118 may be located at approximately the bottom of the cavity 112 of the feeding container 102 to detect when the feeding container 102 is full. The second sensor 120 may be located at approximately the top of the cavity 112 to detect when an object is located at the top of the feeding container 102 for the placement mechanism 104 to load onto the conveyor system 106. The second sensor 120 may also detect when the feeding container 102 is empty by determining whether there is an object at the top of the cavity 112. When there is not an object at the top of the cavity 112, the feeding container 102 may be empty. When there is an object at the top of the cavity 112, the feeding container 102 may include an object an object that is located at the top of the feeding container 102 for the placement mechanism 104 to load onto the conveyor system 106.

The number of feeding containers 102 in the object sorting device 100 is not intended to be limiting. In one example, the object sorting device 100 may include a single feeding container 102. In another example, the object sorting device 100 may include multiple feeding containers 102.

The feeder may include the placement mechanism 104. The placement mechanism 104 may include a motor 122, a first actuating arm 124 and a second actuating arm 126. The motor 122 may be connected to the first actuating arm 124 and the second actuating arm 126. The motor 122 may rotate the first actuating arm 124 between a first position where the first actuating arm 124 is located above the cavity of a feeding container 102 and a second position where the first actuating arm 124 is located above a conveyor belt 128 of the conveyor system 106. The motor 122 may rotate the second actuating arm 126 between a first position where the second actuating arm 126 is located above the cavity of a feeding container 102 and a second position where the second actuating arm 126 is located above a conveyor belt 128 of the conveyor system 106.

In one embodiment, the motor 122 may be connected to a processing device that may send instruction or signals or signals to engage the motor 122 to switch between the first position and the second position. The processing device may be a processor, a central processing unit (CPU), a programmable logic controller (PLC), and so forth. In one example, the PLC may send control signals to the motor 122 to switch the first actuating arm 124 between the first position and the second position.

The first actuating arm 124 may include a first plate 130 and the second actuating arm 126 may include a second plate 132. The first plate 130 may include a grabbing device and a flexing device on a bottom surface of the first plate 130. The second plate 132 may similarly include a grabbing device and a flexing device on a bottom surface of the second plate 132. In one embodiment, the grabbing device may be a suction cup formed to pick up an object when the suction cup is pressed against the object. In another embodiment, the grabbing device may be a fastener such as a hook, a vacuum device, an adhesive, and so forth that is configured to attach to the object to be able to lift the object. In another embodiment, the grabbing device may be a powered roller. The powered roller may grab an object, such as a card on top of a stack of card in the feeding container 102, and urge the object from the opening of the receiving container 102.

When the grabbing device has clasped or adhered to the object, the motor 122 may switch the first actuating arm 124 to the second position above the conveyor belt 128. When the first actuating arm 124 is located above the conveyor belt 128, the grabbing device may release the object onto the conveyor belt 128.

The motor 122 may repeatedly switch the first actuating arm 124 or second actuating arm 126 between the first position and the second position as it receives position instructions from the processing device 138 to move objects from the feeding containers 102 to the conveyor belt 128. In one example, the conveyor belt 128 may include an object platform 144 for the first actuating arm 124 and/or the second actuating arm 126 to place the object onto. The object platform 144 may be a platform that holds the object above the conveyor belt 128 so that the object does not rest on conveyor belt 128, as discussed below. channel In one embodiment, the motor 122 may actuate the first actuating arm 124 or second actuating arm 126 to dispense the objects from the feeding containers 102 in a sequential or serial order. For example, when the feeding containers 102 include multiple objects, the motor 122 and the first actuating arm 124 may sequentially dispense the objects from the feeding containers 102 to the conveyor belt 128. The motor 122 may similarly switch the second actuating arm 126 from a first position to a second position to move objects in other feeding containers 102 to the conveyor belt 128. For example, the object sorting device 100 may include feeding containers 102 on the left side of the conveyor belt 128 and the right side of the conveyor belt 128. The motor 122 may actuate the first actuating arm 124 to move objects from the left-side feeding containers 102 onto the conveyor belt 128 and actuate the second actuating arm 126 to move objects from the right-side feeding containers 102 onto the conveyor belt 128. In another embodiment, the motor 122 may actuate the first actuating arm 124 to empty the left-side feeding containers 102 and then actuate the second actuating arm 126 to empty the right-side feeding containers 102.

The feed may include the conveyor belt 128. The conveyor belt 128 may extend from the feeding containers 102 to the receiver containers 108 to convey the objects from the feeding containers 102 to the receiver containers 110. The motor 122 or another motor may rotate a conveyor belt 128 when it receives a rotate instruction for the processing device 138 or another processing device to move the objects from the feeding containers 102 to the receiver containers 110. In one example, a recognition device 108 may be attached to the conveyor belt 128 or located along the conveyor belt 128 between the feeding containers 102 and the receiver containers 110. As the objects travel along the conveyor belt 128, the recognition device 108 may analyze the objects to identify characteristic information of each object.

To identify the characteristic information of on object, the recognition device 108 may include a first sensor 134. The first sensor 134 may be an optical sensor, an infrared sensor, a camera, an imaging sensor, and so forth. In one example, the first sensor 134 may be position above the conveyor belt 128 to take an image of the object as it travels along the conveyor belt 128 to the receiver containers 108. In one embodiment, when the recognition device 108 uses the first sensor 134 to take the image of the object, the motor 122 may stop the conveyor belt 128 while the first sensor 134 captures the image. In another embodiment, the recognition device 108 may use the first sensor 134 to capture the image while the object travels along the conveyor belt 128 to the receiver containers 108.

In one embodiment, the recognition device 108 may include a second sensor 136. In one embodiment, the second sensor 136 may be a different type of sensor than a type of the first sensor 134 to identify different characteristic information than the first sensor 134. For example, the first sensor 134 may be an optical sensor to capture an image of the object and the second sensor 136 may be an ultrasonic sensor to determine the type of object or the condition of the object. In another embodiment, the first sensor 134 may be located above the object to capture an image of a top side of the object and the second sensor 136 may be located beneath the object to capture an image of a bottom side of the object. In another embodiment, the first sensor 134 may be located at a first position to capture a top or bottom image from a first angle and the second sensor 136 may be located at a second position to capture a top or bottom image from a second angle. The processing device 138 can then use the images from the two angles to increase a clarity of the image or an accuracy of the identification of the character information.

In another embodiment, the first sensor 134 may include a camera with a lens having a macro resolution. The camera may capture an image stream or individual images that may be analyzed by the processing device 138. The processing device 138 may be a processor, a central processing unit (CPU) a programmable logic controller (PLC), and so forth. In example, the image stream may be a live image stream. The image stream or individual images may be segmented to extract characteristic information. In one embodiment, the processing device 138 may determine an orientation of the object. For example when the object is a card, the processing device 138 may determine different possible card orientations, such as an facing up orientation, a facing down orientation, a front edge forward orientation, or a back edge forward orientation, and so forth.

In view of the orientation of the card, the image may be preprocessed by the processing device 138. Preprocessing the image may include cropping the image, adjusting a contrast level or brightness level of the image, straightening an orientation of the image, and so forth. The preprocessed image may then be analyzed to identify characteristic information of the object. The characteristic information may include rank of the object, a type of the object, an identification code of the object, a color of the object, an alphabetic designation of the object, a monetary value of the object, a rarity value of the object, a print run value of the object, a physical condition of the object, a shape of the object, a size of the object, a thickness of the object, an imprinted image on the object, imprinted text on the object, and so forth. In one embodiment, the processing device 138 may be attached to the object sorting device 100. In another embodiment, the processing device 138 may be in data communication with a remote or cloud-based processor or server, where the image data is sent by the processing device to the remote or cloud-based processor or server, the remote or cloud-based processor or server may analyze the image, and then the remote or cloud-based processor or server may send characteristic information back to the processing device 138.

To identify the characteristic information, the recognition device 108 may include a processing device 138 to analyze the image. The processing device 138 may be coupled to a data storage device 140 or in data communication with the data storage device 140. The data storage device 140 may store a database of object information associated with different types of objects or different information printed on the surface of the objects. The processing device 138 may compare the image from the object with the object information to identify characteristic information associated with the object. In one embodiment, the processing device 138 may identify a first set of object information and a second set of object information. The processing device 138 may identify one or more sets of characteristic information that match the first set of object information and the second set of object information.

When the processing device 138 has identified characteristic information associated with the object, the processing device 138 may identify a receiver container 110 that is associated with the characteristic information. The conveyor belt 128 may include slots for the object. The processing device 138 may generate a unique identifier (UID) and associate it with a slot of the card and a receiver container 110. The processing device 138 may then send an instruction or signal to a sorter. The sorter may include the motor 122 to rotate the conveyor belt 128 until the slot is aligned with an opening of a receiver container 110 that is associated with the characteristic information. For example, the processing device 138 may assign a first UID to a receiver container 110 and a second UID to the object or a slot where the object is located. The processing device 138 may then determine that the slot is aligned with an opening of a receiving container 110. The processing device 138 may then determine if a UID associated with the receiving container 110 matches the second UID. When the first UID matches the second UID, the processing device 138 may send an extraction instruction or signal an extraction mechanism 142 of the sorter to move the object into the opening of the receiving container 110. When the UIDs do not match, the processing device 138 may send an instruction or signal to the motor 122 to rotate the conveyor belt 128 a defined amount to align the object with a slot of another receiving container 110. The processing device 138 may repeatedly check the UIDs until the UID associated with the object matches a UID associated with the receiving container 110.

In one embodiment, the extraction mechanism 142 may be attached to the conveyor belt 128 or the receiver containers 110. In one example, the extraction mechanism 142 may be attached to the receiving containers 110 on a right side of the conveyor belt 128. In another example, the extraction mechanism 142 may be attached to the receiving containers 110 on a left side of the conveyor belt 128. In another example, the extraction mechanism 142 may be attached to the receiving containers 110 on both sides of the conveyor belt 128. The processing device 138 may send an instruction or signal to the extraction mechanism 142 to place the object into the receiver container 110 when the object is aligned with an opening of the receiver container 110. When the slot for the object is aligned with an opening of the associated receiver container 110, the extraction mechanism 142 may remove the object from the conveyor belt 128 and place it into the receiver container 110.

In one embodiment, the extraction mechanism 142 may include a servo and a paddle, as discussed below. When the slot is aligned with the opening of the receiver container 110, the extraction mechanism 142 may include a controller to execute an extension instruction or signal from the processing device 138 and engage the servo to extend the paddle to push the object from the conveyor belt 128 into the slot of the receiver container 110. When the paddle has extended to push the object into the slot, the processing device 138 may then send a retraction instruction or signal to the controller and the controller may retract the paddle.

The receiver container 110 may include platforms 152 that the object may be placed on. The receiver container 110 may include a lifting mechanism 146 to raise or lower the platforms 152 to receive the object from the extraction mechanism 142. In one embodiment, the lifting mechanism 146 may include a motor connected to the platform 114. The motor may engage the platform 152 to raise or lower the platform 152. For example, when an object is placed on the platform 152 by the extraction mechanism 142, the motor may lower the platform 152 by a defined amount to provide space to receive a subsequent object.

In one embodiment, the receiving container 110 may include a first sensor 148 approximate the bottom of the receiving container 110 to monitor when a cavity 154 of the receiving container 110 is full. In another embodiment, the receiving container 110 may include a second sensor 150 approximate the top of the receiving container 110 to monitor when the receiving container 110 is empty. In one embodiment, the processing device 138 may stop the object sorting device 100 when the receiving container 110 is full and until the receiving container 110 is emptied. For example, when the full receiving container 110 is emptied, the object sorting device 100 may resume sorting the objects. In one example, when the receiving container 110 is emptied, an operator may press a resume button of the object sorting device 100 to reinitiate the object sorting device 100. When the resume button is pressed, the motor may raise the platform until it reaches a top position to receive subsequent objects.

In another embodiment, when the receiving container 110 is full, the processing device 138 may direct an object initially directed to the full receiving container 110 to another receiving container 110 that is not full. In one embodiment, the first sensor 148 and/or the second sensor 150 may be a contact switch, a pressure sensor, a light sensitive diode, and so forth.

In another embodiment, the processing device 138 may detect when an error has occurred, For example, when an individual has removed the object from the conveyor belt 128, the processing device 138 may detect that an object was not moved from the conveyor belt 128 to the receiving container 110. In one embodiment, the processing device 138 may stop the object sorting device 100 until it receives an input from a user interface clearing the error. In another embodiment, when an individual has removed the object from the conveyor belt 128, the processing device 138 may send a notification to another electronic device indicating that the error has occurred. In one example, the other electronic device may be a smartphone, a computing device, or other devices associated with an individual. The error may indicate an object is misaligned, an object has been tampered with or removed, or an object with a UID that does not match any of the receiving containers 110.

In one embodiment, the processing device 138 may communicate the object information or information indicating which objects are located in which receiving containers 110. The information may be communicated to an application for further analysis. In one embodiment, the application may be an inventory management application or a commerce application, such as a website where the object may be sold.

Figures 2A, 2B:
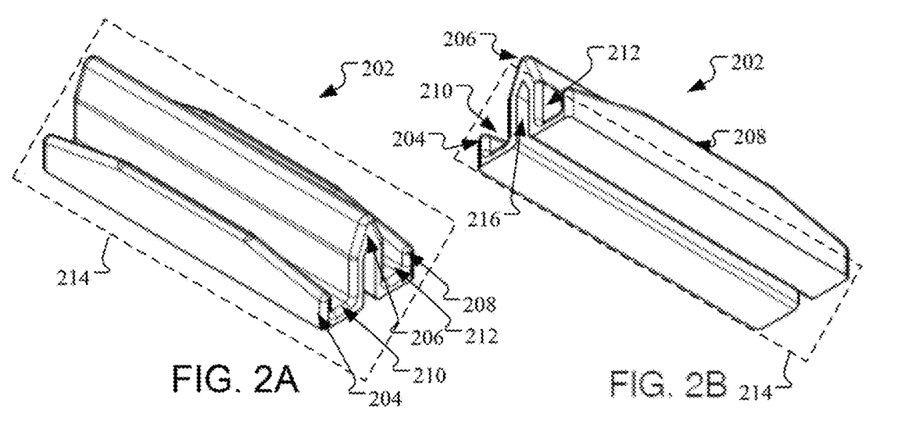
FIG. 2A illustrates a top perspective view of an object platform element of the object platform in FIG. 1, according to an embodiment.
FIG. 2B illustrates a bottom perspective view of the object platform element, according to an embodiment.

FIG. 2A illustrates a top perspective view of an object platform element 202 of the object platform 144 in FIG. 1, according to an embodiment. The object platform element 202 may include a first side ridge 204, middle ridge 206, and a second side ridge 208. The first side ridge 204 may be a portion of the object platform element 202 that extends perpendicularly from a plane 214 and has a defined height and length. The first side ridge 204 may be connected to a first channel 210 that runs between the first side ridge 204 and the middle ridge 206. The first channel 210 may be a portion of material that may extend along the plane 214 approximately the length of the middle ridge 206. The middle ridge 206 may extend perpendicularly from the plane 214 and has a defined height and length. The middle ridge 206 may be connected to a second channel 212 that runs between the middle ridge 206 and the second side ridge 208. The second channel 212 may be a portion of material that extends along the plane 214 approximately the length of the middle ridge 206. The second side ridge 208 may extend perpendicularly from the plane 214. In one example, the first side ridge 204, the middle ridge 206, and the second side ridge 208 may be approximately the same height and/or length. In another example, the first side ridge 204, the middle ridge 206, and the second side ridge 208 may be different heights and/or lengths. In one example, the middle ridge 206 may be taller than the first side ridge 204 or the second side ridge 208. In another example, the first side ridge 204 may be approximately the same height as the second side ridge 208. The first side ridge 204, the middle ridge 206, the second side ridge 208, the first channel 210, and the second channel 212 may be a plastic material, a rubber material, a polyurethane material, and so forth.

FIG. 2B illustrates a bottom perspective view of the object platform element 202, according to an embodiment. Some of the features in FIG. 2B are the same or similar to some of the features in FIG. 2A as noted by same reference numbers, unless expressly described otherwise. In one example, the middle ridge 206 may include a conduit 216 that extends perpendicularly from the plane 214. The conduit 216 may extend from a bottom of the middle ridge 206 to a center portion of the middle ridge 206. The conduit 216 may be an open space that extends from a bottom of the middle ridge 206 to a region below a top of the middle ridge 206.

Figures 2C, 2D:
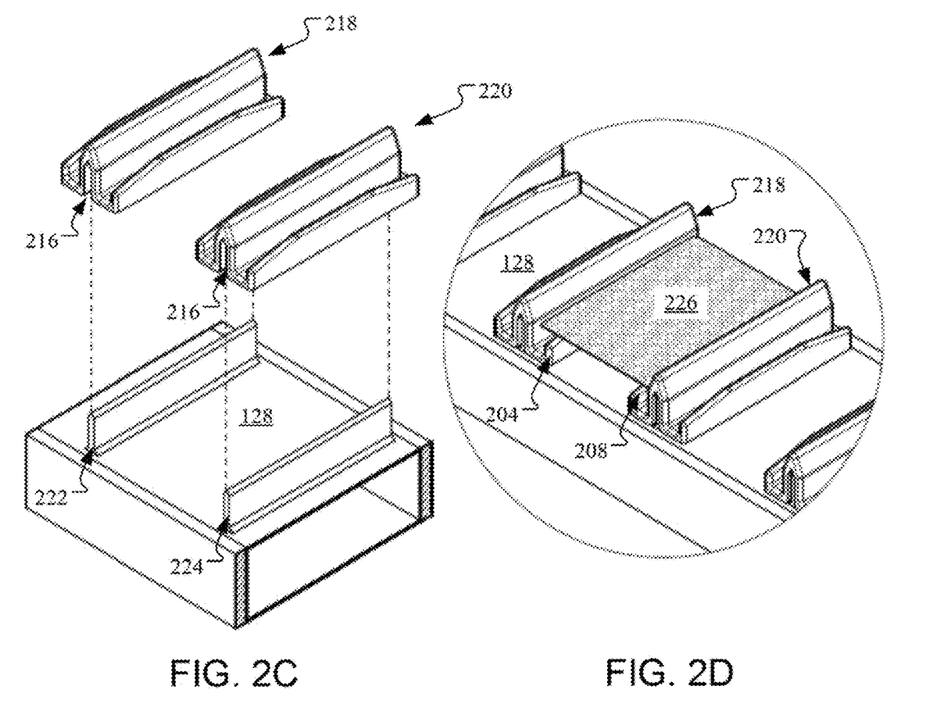
FIG. 2C illustrates a first object platform element and a second object platform element, according to an embodiment.
FIG. 2D illustrates an object resting between the first object platform element and the second object platform element, according to an embodiment.

FIG. 2C illustrates a first object platform element 218 and a second object platform element 220, according to an embodiment. Some of the features in FIG. 2C are the same or similar to some of the features in FIGS. 1 and 2A-2B as noted by same reference numbers, unless expressly described otherwise.

The conveyor belt 128 may include a first connector 222 and a second connector 224. The first connector 222 may be space a defined distance from the second connector 224 along the conveyor belt 128 to receive an object that may rest between the first object platform element 218 and the second object platform element 220. The first connector 222 may be connected to the conveyor belt 128 and extend perpendicularly from the conveyor belt 128 to a given height and extend at least a portion of the width of the conveyor belt 128. The first connector 222 may be shaped to be inserted into at least a portion of the conduit 216 of the first object platform element 218 to connect the first object platform element 218 to the conveyor belt 128. The second connector 224 may be connected to the conveyor belt 128 and extend perpendicularly from the conveyor belt 128 to a given height and extend at least a portion of the width of the conveyor belt 128. The second connector 224 may be shaped to be inserted into at least a portion of the conduit 216 of the second object platform element 220 to connect the second object platform element 220 to the conveyor belt 128.

FIG. 2D illustrates an object 226 resting between the first object platform element 218 and the second object platform element 220, according to an embodiment. Some of the features in FIG. 2D are the same or similar to some of the features in FIGS. 1 and 2A-2C as noted by same reference numbers, unless expressly described otherwise. The conveyor belt 128 may include the first object platform element 218 and the second object platform element 220 spaced apart along the conveyor belt 128 at a defined distance. The object 226 may rest on the first ridge 204 of the first object platform element 218 and on the second side ridge 208 of the second object platform element 220. In one example, the object 226 may be a card, such as a collectible sports card. The card may rest on the first ridge 204 of the first object platform element 218 and on the second side ridge 208 of the second object platform element 220. The platform element 218 and the second object platform element 220 may provide a platform where the object 226 may be place onto the conveyor belt 128 and moved off of the conveyor belt 128 without damaging the object 226. In one example, the first object platform element 218 and the second object platform element 220 may be plastic material or polyurethane material that the card may easily slide with minimal friction to enable the card to slide on or off of the first object platform element 218 and the second object platform element 220.

Figure 3:
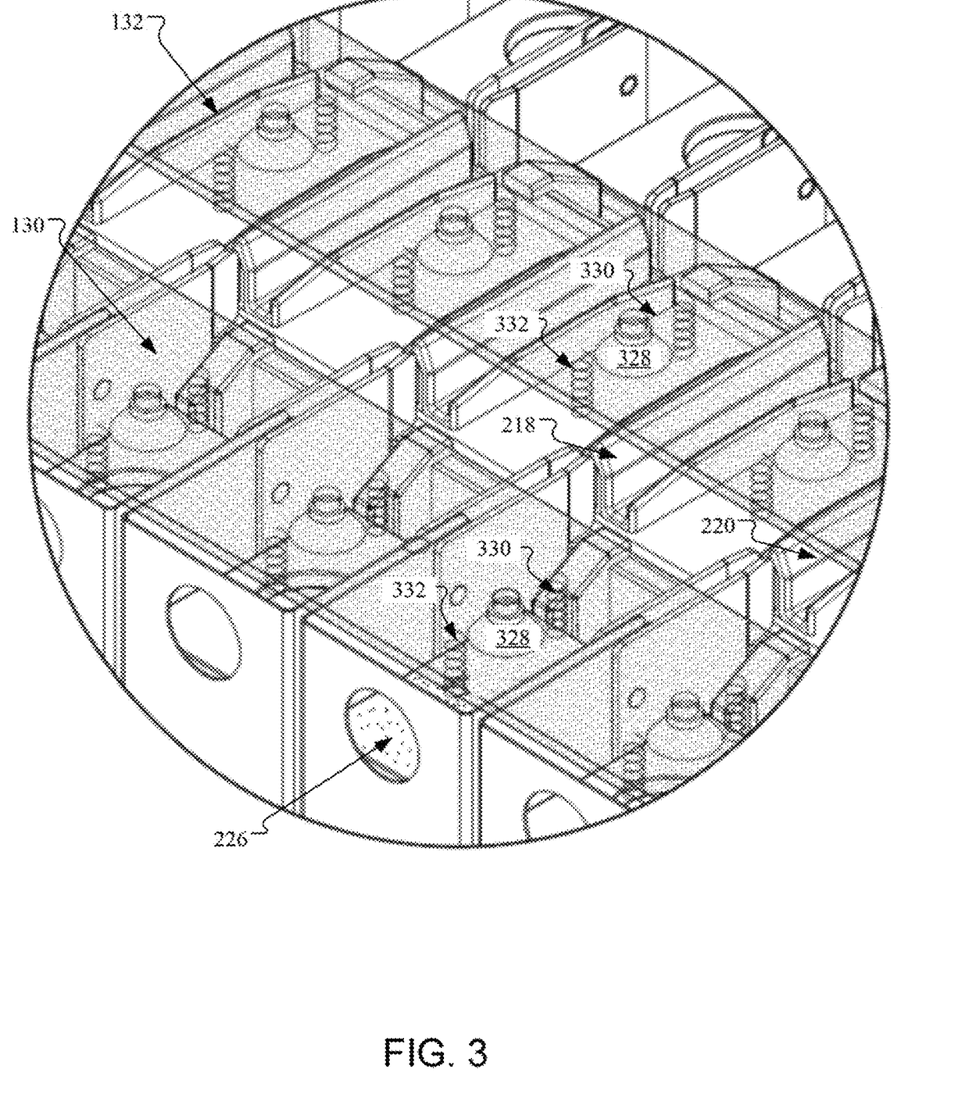
FIG. 3 illustrates an explode view of the first plate and the second plate of the placement mechanism in FIG. 1, according to an embodiment.

FIG. 3 illustrates an explode view of the first plate 130 and the second plate 132 of the placement mechanism 104 in FIG. 1, according to an embodiment. Some of the features in FIG. 3 are the same or similar to some of the features in FIGS. 1 and 2A-2D as noted by same reference numbers, unless expressly described otherwise. In one embodiment, the first plate 130 and/or the second plate 132 may include a grabbing device 328, a first flexing device 330, and/or a second flexing device 332.

As discussed above, when the first actuating arm 124 is in the first position, the grabbing device 328 may be pressed against the object 226 to clasp or adhere to the object 226 so that the object 226 may be lifted by the first plate 130. When the first actuating arm 124 is in the second position, the grabbing device 328 may release the object 226 so that the object 226 may be placed on the first object platform element 218 and the second object platform element 220.

In another embodiment, the first flexing device 330 and/or the second flexing device 332 may flex or deform the object 226 so that the grabbing device 328 may clasp or adhere to a threshold number of objects 226. For example, when the object 226 is a card, the grabbing device 328 may be pressed against the card. The first flexing device 330 and/or the second flexing device 332 may flex the card so that the card curves. The card may be curved so that when the card is in a stack of multiple cards, the card may not adhere to the other cards. For example, when multiple cards are stacked on top of each other, the cards may stick to each other because of humidity or because materials such as sweat or dust have accumulated on the surfaces of the cards. The first flexing device 330 and/or the second flexing device 332 may flex the top card of the stack to break a bond between the top card and other cards in the stack.

In one embodiment, the grabbing device 328 may be a suction cup. In another embodiment, the grabbing device 328 may be a vacuum device to suck the object against the first plate 130 or the second plate 132. In another embodiment, the first flexing device 330 and/or the second flexing device 332 may be springs that are approximate to the grabbing device 328. In another embodiment, the first flexing device 330 and/or the second flexing device 332 may be protrusions such as plastic posts that are approximate to the grabbing device 328.

Figure 4:
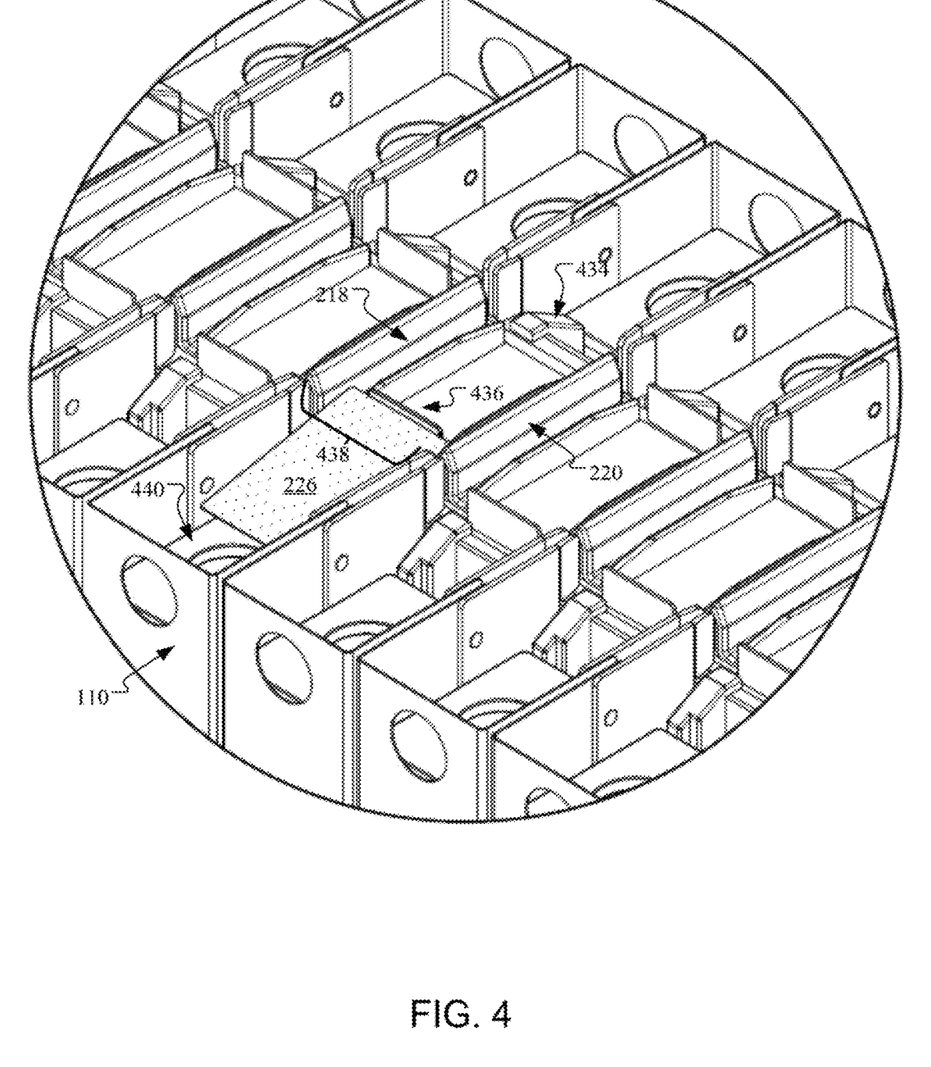
FIG. 4 illustrates a magnified view of the extraction mechanism in FIG. 1, according to an embodiment.

FIG. 4 illustrates a magnified view of the extraction mechanism 142 in FIG. 1, according to an embodiment. Some of the features in FIG. 4 are the same or similar to some of the features in FIGS. 1 and 2A-2D as noted by same reference numbers, unless expressly described otherwise. As discussed above, the extraction mechanism 142 may include a servo 434 and a paddle 436. When the object 226 is aligned with an opening 438 of the receiver container 110, a controller of the extraction mechanism 142 may execute an extension instruction or signal received from the processing device 138 to engage the servo 434. The servo 434 may to extend the paddle 436 and push the object 226 from the first object platform element 218 and the second object platform element 220 into the slot 440 of the receiver container 110. When the paddle 436 has extended to push the object 226 into the slot 440, the processing device 138 may then send a retraction instruction or signal to the controller and the controller may retract the paddle 436.

In one example, when the servo 434 engages the paddle 436 to push the object 226 from the first object platform element 218 and the second object platform element 220 to the opening 438, the paddle 436 may gently push the object 226 into the opening 438 to avoid damaging the object 226. The processing device 138 may send the extension instruction or signal when a UID associated with the object 226 and a UID associated with the receiving container 110 match. When the UIDs to not match, the processing device 138 may not send the extension instruction or signal to the servo 434 and may send an instruction or signal to the motor 122 to rotate the conveyor belt 128 a defined amount.

Figure 5:
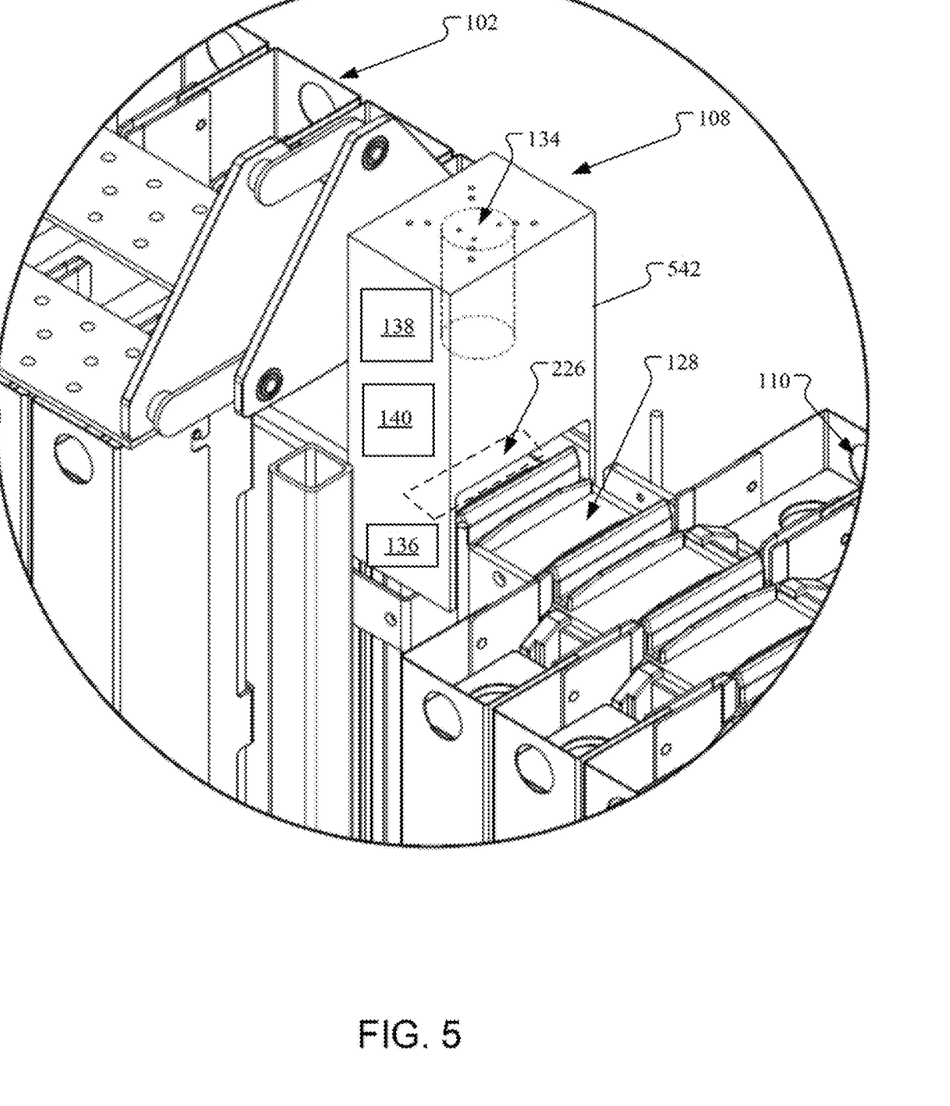
FIG. 5 illustrates a magnified view of the recognition device, according to an embodiment.

FIG. 5 illustrates a magnified view of the recognition device 108, according to an embodiment. Some of the features in FIG. 5 are the same or similar to some of the features in FIGS. 1 and 2A-2D as noted by same reference numbers, unless expressly described otherwise. The recognition device 108 may be attached to the conveyor belt 128 between the feeding containers 102 and the receiver containers 110. For example, a body 542 of the recognition device 108 may be attached to each side of the conveyor belt 128 by a fastener, such as a screw, a hook, a rivet, an adhesive, and so forth.

The first sensor 134 may be positioned above the conveyor belt 128 to take an image of the object 226 as it travels along the conveyor belt 128 to the receiver containers 108. The second sensor 136 may be located beneath the object 226 to capture an image of a bottom side of the object 226. The processing device 138 may use the images from the first sensor 134 and/or the second sensor 136 to identify character information of the object 226. The first sensor 134 and/or the second sensor 136 may capture an image stream or individual images of the object 226 that may be analyzed by the processing device 138. The processing device 138 may be a processor, a central processing unit (CPU) a programmable logic controller (PLC), and so forth. The processing device 138 may be coupled to the data storage device 140 or in data communication with the data storage device 140. The data storage device 140 may store a database of object information associated with different types of objects or different information printed on the surface of the objects.

FIG. 6A illustrates an exploded view of a container 600, according to an embodiment. The container 600 may be the feeding container 102 or the receiving container 110 in FIG. 1. The container 600 may include a motor 644 connected to a slide rail 646 by a connector 648. The slide rail 646 may include an elevator 650 with a platform connector 652 and a platform 654. The platform connector 652 may connect the platform 654 to the elevator 650. The motor 644 may engage the slide rail 646 to raise or lower the elevator 650. As the elevator 650 raises or lowers, the platform 654 may raise or lower. For example, the motor 644 may rotate clockwise and counterclockwise to rotate a post of the slide rail 646. The post may include a thread, and the motor 644 rotates the post, the elevator 650 may raise or lower along the thread, such as raising when the post rotates clockwise and lowering when the post rotates counterclockwise. In one example, the motor 644 may lower the platform 654 to provide a space to receive an object into the receiving container 110. In another example, the motor 644 may raise the platform 654 to provide an object for the placement mechanism 104 to clasp and place onto the conveyor belt 128 of FIG. 1.

The slide rail 646 may also include a first protective sleeve 656 and a second protective sleeve 658. The first protective sleeve 656 may connect to and protect a first side of the slide rail 646 and the second protective sleeve 658 may connect to and protect a second side of the slide rail 646. The container 600 may also include a body that include a first body element 660 and a second body element 662. The first body element 660 and the second body element 662 may connect to the slide rail 646 or the first protective sleeve 656 and the second protective sleeves 658 to form a protective body around the slide rail 646 and the platform 654 to protect objects located on the platform 654. The first body element 660 may connect to a back of the slide rail 646. The first body element 660 may be a housing that runs along the back of the slide rail 646 and the sides of the slide rail 646. The second body element 662 may connect to a front of the slide rail 646. The second body element 662 may be a housing that runs along the front of the slide rail 646 and the sides of the slide rail 646. The first body element 660 and the second body element 662 may interconnect to form a cavity of the container 600 that objects may be stored within as they rest on the platform 654.

FIG. 6B illustrates an assembled view of the motor 644 and the slide rail 646, according to an embodiment. Some of the features in FIG. 6B are the same or similar to some of the features in FIG. 6A as noted by same reference numbers, unless expressly described otherwise. As discussed above, the connector 648 may connect the motor 644 to the slide rail 646. The motor 644 may engage the slide rail 646 to raise or lower the elevator 650 which in turn raises or lowers the platform connector 652 and the platform 654.

FIG. 6C illustrates a back perspective view of the container 600. Some of the features in FIG. 6C are the same or similar to some of the features in FIGS. 6A and 6B as noted by same reference numbers, unless expressly described otherwise. As discussed above, the first body element 660 may connect to the second body element 662 for form a cavity 664. The cavity 664 may store objects received from the conveyor belt 128 in FIG. 1.

FIG. 6D illustrates a front perspective view of the container 600. Some of the features in FIG. 6D are the same or similar to some of the features in FIG. 6A-6C as noted by same reference numbers, unless expressly described otherwise. As discussed above, the first body element 660 may connect to the second body element 662 for form the cavity 664. The container 600 may receive the objects into the cavity 664 from the conveyor belt 128 in FIG. 1 via the opening 438 in FIG. 4.

Figure 7:
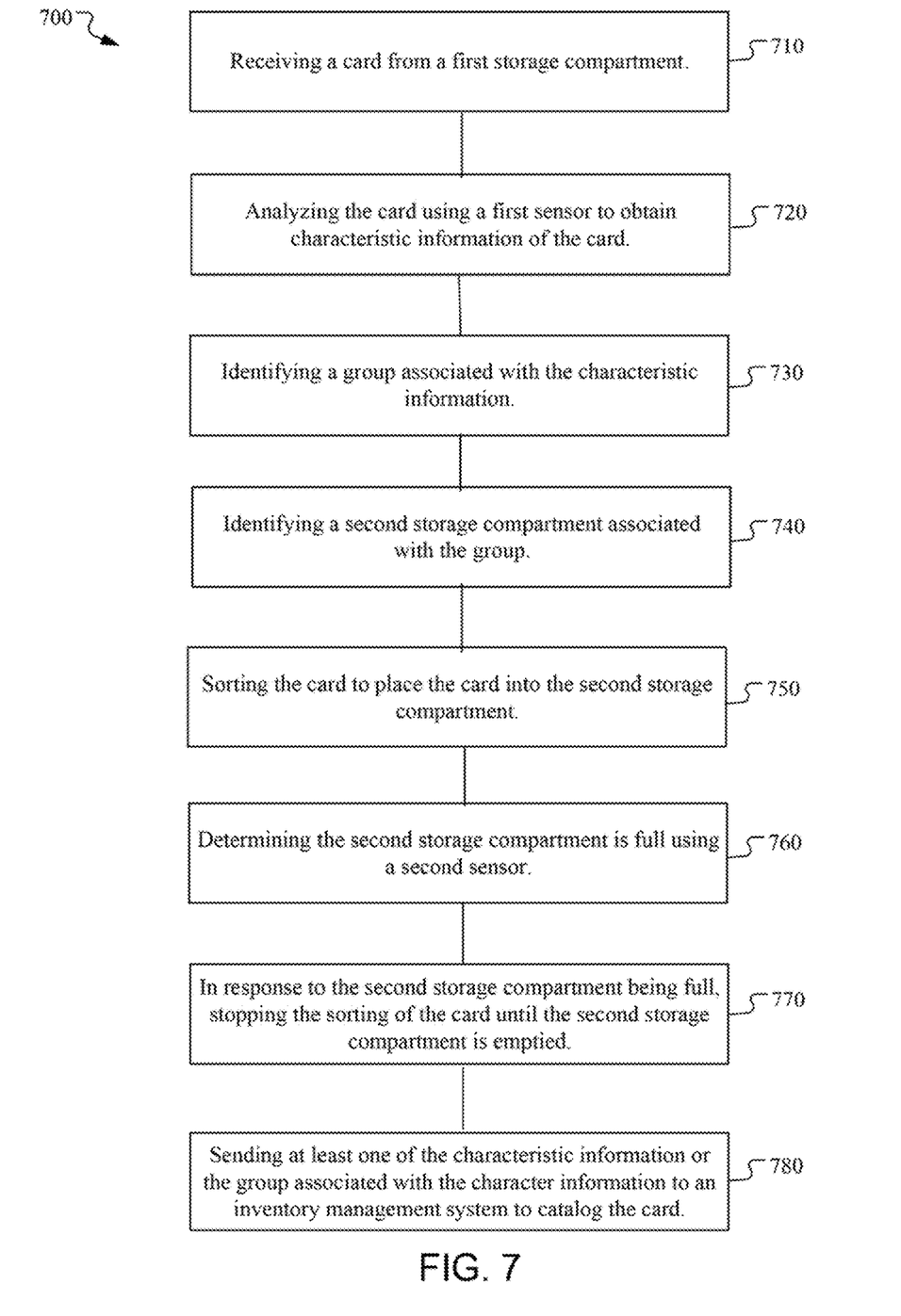
FIG. 7 illustrates a flowchart of method to identify and sort an object, according to an embodiment.

FIG. 7 illustrates a flowchart of method 700 to identify and sort an object, according to an embodiment. The method 700 may be performed, at least in part, by a processor, a central processing unit, a microcontroller, a field programmable gate array, or another type of processing device. The method 700 may include receiving a card from a first storage compartment (block 710). The method 700 may include analyzing the card using a first sensor to obtain characteristic information of the card (block 720). The method 700 may include identifying a group associated with the characteristic information (block 730). The method 700 may include identifying a second storage compartment associated with the group (block 740). The method 700 may include sorting the card to place the card into the second storage compartment (block 750). The method 700 may include determining the second storage compartment is full using a second sensor (block 760). The method 700 may include, in response to the second storage compartment being full, stopping the sorting of the card until the second storage compartment is emptied (block 770). The method 700 may include sending at least one of the characteristic information or the group associated with the character information to an inventory management system to catalog the card (block 780).

The disclosure above encompasses multiple distinct embodiments with independent utility. While each of these embodiments has been disclosed in a particular form, the specific embodiments disclosed and illustrated above are not to be considered in a limiting sense as numerous variations are possible. The subject matter of the embodiments includes all novel and non-obvious combinations and subcombinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed embodiments that are believed to be novel and non-obvious. Embodiments embodied in other combinations and subcombinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus comprising:
a feeder comprising:
a first container to store a card;
a placement mechanism to place the card onto a conveyor belt; and
the conveyor belt to provide the card to a sorter;
an optical recognition device attached to the conveyor belt, the optical recognition device comprising:
an optical sensor to scan the card for first characteristic information of the card; and
a processor to:
identify a group associated with at least the first characteristic information; and
send, to the sorter, a sorting instruction in view of the group associated with at least the first characteristic information; and
the sorter connected to the conveyor belt, the sorter comprising:
a second container;
a third container, the second container being located before the third container along the conveyor belt, wherein the sorter is to:
rotate the conveyor belt to align the card with the second container;
determine that the second container is not associated with the group in view of the sorting instruction;
rotate the conveyor belt to align the card with the third container;
determine that the third container is associated with the group in view of the sorting instruction; and
move the card from the conveyor belt into the second container.

2. The apparatus of claim 1, wherein to analyze the card, the processor is further to:
identify an characteristic information of the card;
match the characteristic information of the card with a database of characteristic information associated with the group, and
generate the sorting instruction for the sorter to sort the card.

3. The apparatus of claim 2, wherein the characteristic information comprises a color of the card, a physical condition of the card, an image imprinted on the card, a shape of the card, a size of the card, text imprinted on the card, or a thickness of the card.

4. The apparatus of claim 1, wherein the group is associated with a color of the card, an alphabetic designation of the card, a monetary value of the card, a rarity value of the card, or a print run value of the card.

5. The apparatus of claim 1, wherein the feeder comprises:
an actuating arm;
a plate connected to the actuating arm, the plate comprising:
a grabbing device to configured to clasp the card, and
a flexing device configured to flex the card;
a motor connected to the actuating arm; and
a controller connected to the motor, the controller to:
in response to the controller receiving an first position instruction from the processor, engage the motor to rotate to actuating arm to place the plate approximate the first container so that the grabbing device claps the card; and
in response to the controller receiving an second position instruction from the processor, engage the motor to rotate to actuating arm to place the plate approximate the conveyor belt so that the grabbing device releases the card.

6. The apparatus of claim 5, wherein:
the conveyor belt further comprises a platform shaped to hold the card; and
the processor is further to:
determine the first container is storing the card; and
in response to determining that the first container is storing the card, send the first position instruction to the controller.

7. The apparatus of claim 1, wherein the sorter further comprises:
a paddle shaped to push the card from the conveyor belt into the second container;
a motor connected to the paddle; and
a controller to:
engage the motor to extend the paddle to push the card from the conveyor belt into the second container when the controller receives an extension instruction from the processor; and
engage the motor to retract the paddle when the controller receives a retraction instruction from the processor.

8. The apparatus of claim 7, wherein:
the conveyor belt further comprises a slot shaped to hold the card; and
the processor is further to:
determine that the slot is aligned with an opening of the second container; and
in response to determining that the slot is aligned with the opening, send the extension instruction to the controller.

9. The apparatus of claim 1, wherein:
the first container comprises a first sensor to monitor when the first container is full or when the first container is empty; and
the second container comprises a second sensor to monitor when the second container is full or when the second container is empty.

10. The apparatus of claim 1, wherein the conveyor belt comprises a platform to hold the card at a plane above a surface of the conveyor belt.

11. The apparatus of claim 1, wherein:
the optical recognition device further comprises a second sensor to obtain second characteristic information of the card; and
the processor is further to:
identify the group associated with at least the first characteristic information and the second characteristic information; and
send, to the sorter, the sorting instruction in view of the group associated with at least the first characteristic information and the second characteristic information.

12. A system comprising:
a feeder comprising a first compartment to store a card;
a recognition device attached to the feeder, the recognition device comprising a processor and a first sensor, wherein the recognition device is to:
analyze, by the processor, the card using the first sensor to obtain characteristic information of the card;
identifying, by the processor, a group associated with the characteristic information; and
send, to a sorter, a sorting instruction in view of the group associated with the characteristic information;

the sorter connected to the feeder, wherein the sorter comprises:
    a paddle shaped to push the card from a conveyor belt into the first compartment;
    a motor connected to the paddle; and
    a controller to:
        identify a second compartment associated with the group in view of the sorting instruction:
        engage the motor to extend the paddle to push the card from the conveyor belt into the second compartment when the controller receives an extension instruction from the processor; and
        engage the motor to retract the paddle when the controller receives a retraction instruction from the processor; and
the conveyor belt connected to the feeder, the recognition device, and the sorter, the conveyor belt to provide the card from the feeder to the sorter.

13. The system of claim 12, wherein:
the conveyor belt further comprises a slot shaped to hold the card; and
the processor is further to:
    assign a first unique identifier (UID) to the second compartment, wherein the first UID is associated with the group;
    assign a second UID with the slot, wherein the second UID is associated with the group;
    determine that the slot is aligned with an opening of the second compartment;
    determine whether the first UID matches the second UID; and
    send the extension instruction to the controller when the first UID matches the second UID.

14. The system of claim 13, wherein the processor is further to send a rotate instruction to a second motor of the conveyor belt to rotate the conveyor belt by a defined amount to align the slot with a third compartment when the first UID does not match the second UID.

15. The system of claim 12, wherein the second compartment comprises:
    a platform configured to raise or lower to receive the card from the conveyor belt; and
    a second sensor to determine when the second compartment receives the card, wherein when the second compartment receives the card, the platform is lowered a defined amount to provide space to receive another card.

16. An apparatus comprising:
a feeder comprising:
    a first container to store a card;
    a placement mechanism to place the card onto a conveyor belt; and
    the conveyor belt to provide the card to a sorter;
an optical recognition device attached to the conveyor belt, the optical recognition device comprising:
    an optical sensor to scan the card for first characteristic information of the card; and
    a processor to:
        identify a group associated with at least the first characteristic information; and
        send, to the sorter, a sorting instruction in view of the group associated with at least the first characteristic information; and
the sorter connected to the conveyor belt, the sorter comprising:
    a second container,
    a paddle shaped to push the card from the conveyor belt into the second container;
    a motor connected to the paddle; and
    a controller to:
        determine that the second container is associated with the group in view of the sorting instruction;
        engage the motor to extend the paddle to push the card from the conveyor belt into the second container when the controller receives an extension instruction from the processor; and
        engage the motor to retract the paddle when the controller receives a retraction instruction from the processor.

17. The apparatus of claim 16, wherein:
the processor is further configured to determine the second container is full using another sensor; and
the controller is further configured to, in response to the second container being full, stop a sorting of the card until the second container is emptied.

18. The apparatus of claim 16, wherein the processor is further configured to send the first characteristic information or the group associated with the first character information to an inventory management system to catalog the card.

* * * * *